United States Patent [19]

Kawashima

[11] Patent Number: 4,792,188
[45] Date of Patent: Dec. 20, 1988

[54] SWIVEL SEAT FOR VEHICLE
[75] Inventor: Hatsuo Kawashima, Kosai, Japan
[73] Assignee: Fuji Kiko Company, Limited, Tokyo, Japan
[21] Appl. No.: 776,829
[22] Filed: Sep. 17, 1985
[30] Foreign Application Priority Data
　Sep. 21, 1984 [JP]　Japan ............................ 59-142228[U]
[51] Int. Cl.$^4$ ............................ A47C 3/18; B60N 1/02
[52] U.S. Cl. .................................... 297/349; 248/418; 248/425; 296/65.1
[58] Field of Search ................ 297/349; 108/140, 142; 248/415, 418, 425; 296/65 R

[56]　　　　References Cited
U.S. PATENT DOCUMENTS

| | | | |
|---|---|---|---|
| 1,547,849 | 7/1925 | Van Den Boogaard et al. | 108/142 |
| 2,225,735 | 12/1940 | Cederquist. | |
| 2,821,240 | 1/1958 | Morrill, Jr. | 108/140 |
| 2,851,321 | 9/1958 | Malburg | 108/140 |
| 4,401,287 | 8/1983 | Moeser | 248/425 |
| 4,518,139 | 5/1985 | Barfell | 108/142 X |

FOREIGN PATENT DOCUMENTS

| | | | |
|---|---|---|---|
| 2847 | 2/1887 | United Kingdom | 108/140 |
| 3429 | 2/1889 | United Kingdom | 108/140 |

Primary Examiner—Kenneth A. Dorner
Assistant Examiner—Peter R. Brown
Attorney, Agent, or Firm—Bachman & LaPointe

[57]　　　　ABSTRACT

A swivel seat for a vehicle is provided with latch means which prevents the front and rear edges of the seat from being raised so as to prevent distortion of the pivot axle, the locking means and/or roller or rollers. The latch means can be actuated to its effective position, in which it prevents lift of the front or rear edge of the seat when the seat is in its normal position. Preferably, the seat also has means cooperating with rollers and a pivot axle for supporting components rotatable relative to the stationary component. The supporting means serves to hold the movable component essentially parallel to the stationary component so as to reduce the load on the rollers and the pivot axle while allowing smooth pivotal movement of the movable component relative to the stationary component.

7 Claims, 4 Drawing Sheets

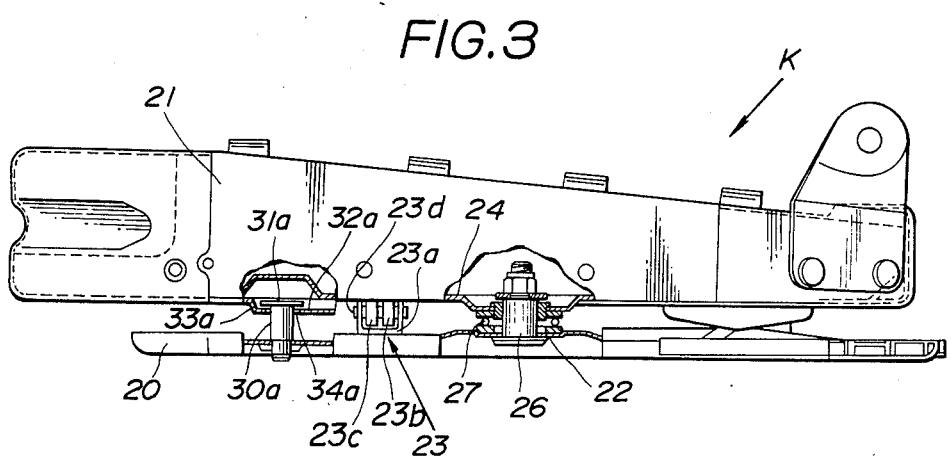
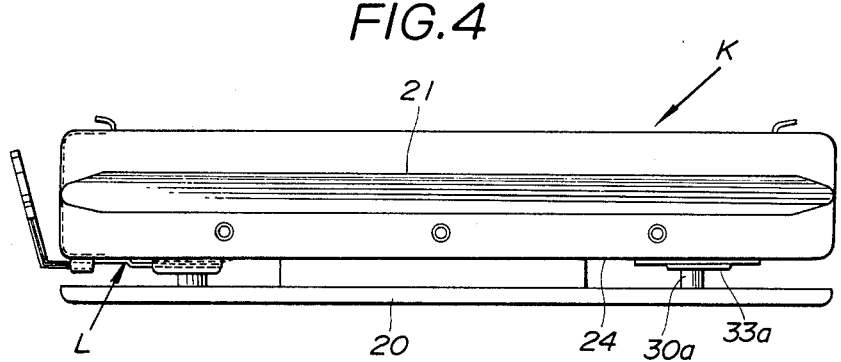
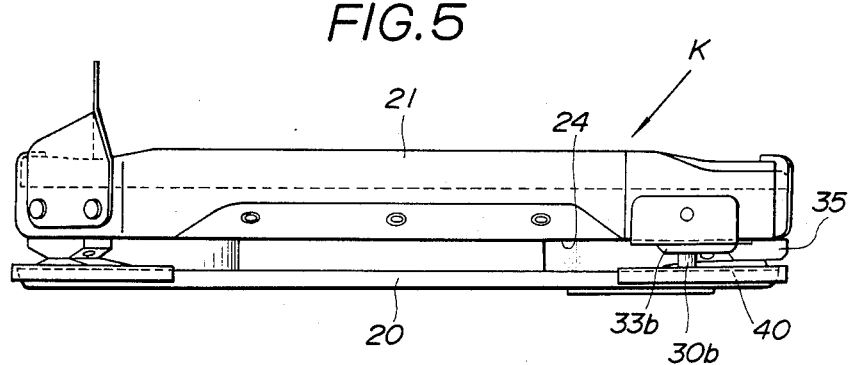

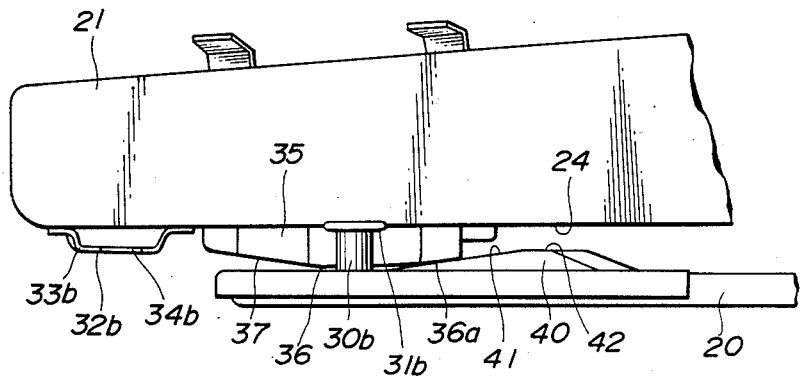
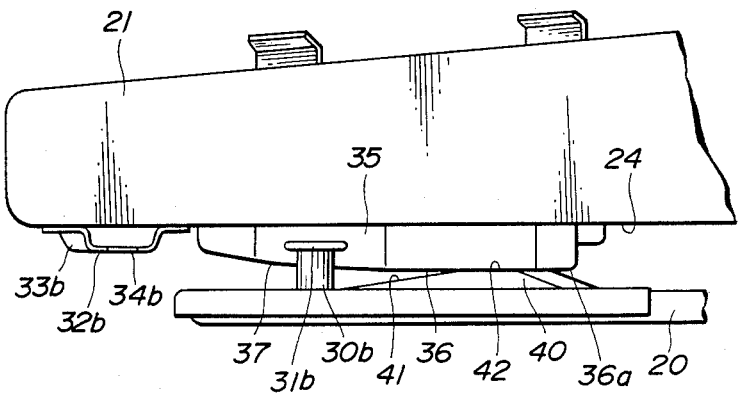
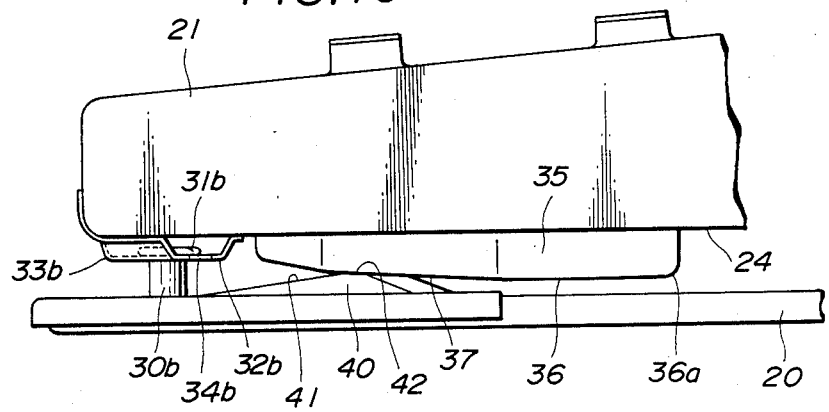

SWIVEL SEAT FOR VEHICLE

BACKGROUND OF THE INVENTION

The present invention relates generally to a swivel seat for a vehicle. More specifically, the invention relates to a swivel seat pivotable between a normal frontwardly directed position and a pivoted position directed toward a door opening for convenience of entry into and exit from the vehicle.

Conventionally, some types of vehicles employ swivel seats or rotatable seats. Those swivel or rotatable seats are pivotable or rotatable generally about a central, vertical pivot axis. Pivot mechanisms enable these seats to rotate.

The pivot mechanism generally comprises a stationary base, a pivotal seat cushion frame and a pivot axle projecting from the stationary base and pivotably or rotatably supporting the pivotal seat cushion frame. One or more roller assemblies between the stationary base and the pivotal seat cushion frame allow smooth pivotal movement or rotation of the seat cushion frame relative to the stationary base. A locking mechanism locks the seat in its normal, forward-facing position.

In such swivel or rotatable seats, the pivot axle and roller or rollers have to support the weight of the seat assembly which comprises a seat cushion and a seat back as well as that of the occupant of the seat. Therefore, the load on the pivot axle and the roller or rollers is relatively high. In addition, the load due to the weight of the occupant is not necessarily distributed evenly over the seat. An uneven load exerted on the seat may tend to lift either the front or rear edge of the seat. This uneven load is thus manifested as a distorting force on the pivot axle, the locking mechanism and the roller or rollers. Since conventional swivel seats have no way to prevent the front or rear edge of the seat from raising due to uneven load, the pivot axle, the locking mechanism and/or the roller or rollers are subject to distorting forces which shorten its service life and degrade durability.

In addition, the roller or rollers must be strong enough to withstand the heaviest possible instantaneous load, which arises when the occupant sits down. This enforces an increased roller area. Increased roller size leads to the problem of differential of radius of curvature between the parts of the roller nearest to and farthest away from the central pivot axis, which implies differential rates of rotation. As a result, the roller must slip to allow smooth pivotal rotational movement of the seat cushion frame relative to the stationary base. This slip results in disturbing noise.

SUMMARY OF THE INVENTION

It is therefore a principle object of the present invention, to eliminate or ameliorate the aforementioned problems or defects in conventional swivel or rotatable seats.

In order to accomplish the aforementioned and other specific objects, a swivel seat for a vehicle, according to the present invention, is provided with latch means which prevents the front and rear edges of the seat from being raised so as to prevent distortion of the pivot axle, the locking means and/or roller or rollers.

The latch means can be actuated to its effective position, in which it prevents lift of the front or rear edge of the seat when the seat is in its normal position. Preferably, the seat also has means cooperating with rollers and a pivot axle for supporting components rotatable relative to the stationary component. The supporting means serves to hold the movable component essentially parallel to the stationary component so as to reduce the load on the rollers and the pivot axle while allowing smooth pivotal movement of the movable component relative to the stationary component.

According to one aspect of the invention, a swivel seat comprises a stationary component secured to a floor, a pivotal component supporting a seat cushion for rotation therewith and pivotably supported directly above the stationary component, the pivotal component being pivotable between a first normal position and a second pivoted position displaced by a predetermined angle from the first position, and latching means for restricting vertical displacement of the pivotal component relative to stationary component, the latching means including a first member secured to the stationary component and a second member secured to the pivotal component and engageable to the first member at least at the first position of the pivotal component.

The swivel seat further comprises locking means for locking the pivotal component so as to prevent the latter from pivoting, the locking means being active at least at the first position of the pivotal component. The swivel seat also has at least one roller assembly disposed between the pivotal component and the stationary component for smooth pivotal movement of the pivotal component.

The first member and second member of the latching means are engageable to each other when the pivotal component is in the first position and restrict upward movement of the pivotal component when engaged.

The second member is secured to the front and/or rear edge of the pivotal component so as to restrict upward displacement of the corresponding front and/or rear edge of the pivotal component.

The swivel seat further comprises a third member secured to the stationary component and a fourth member secured to the pivotal component and cooperating with the third member to vertically position the pivotal component in a predetermined relationship with the stationary conponent, at least at the first position of the pivotal component. the third and fourth members, when cooperating, restrict downward displacement of the pivotal component toward the stationary component.

The third member comprises a first section having a level surface with an active edge and a second section having a sloped surface decreasing in height toward an end remote from the first section, and the fourth member comprises a third section having a level surface with an active edge and a fourth section having a sloped surface decreasing in vertical dimension toward an end remote from the third section, and the third and fourth members cooperating in such a manner that during pivotal movement of the pivotal component from the second position to the first position;

the active edge of the first section comes into contact with the sloped surface of the fourth section;

then the active edge of the first section moves toward the level surface of the third section along the sloped surface of the fourth section so as to raise the pivotal component to a predetermined highest position;

the level surface of the first section then comes into contact with and crosses the level surface of the third section; and the sloped surface of the second section finally comes into contact with a junction between the third section and the fourth section and then crosses the sloped surface of the fourth section, whreby the pivotal component is lowered to a predetermined vertical position relative to the stationary component at the first position of the pivotal component.

The roller assembly comprises an inner roller and an outer roller independently rotatably mounted on a common axle.

BRIEF DESCRIPTION OF THE DRAWINGS

The present invention will be understood more fully from the detailed description given herebelow and from the accompanying drawings of the preferred embodiment of the invention, which however, should not be taken to limit the invention to the specific embodiments, but are for explanation and understanding only.

In the drawings:

FIG. 3 is a side elevation of the swivel seat frame of FIG. 2;

FIG. 4 is a front elevation of the swivel seat frame of FIG. 2;

FIG. 5 is a rear elevation of the swivel seat frame of FIG. 2;

FIGS. 8 to 10 are side elevations showing the swivel seat frame at different points during its pivotal movement.

DESCRIPTION OF THE REFERRED EMBODIMENT

Figure 1:
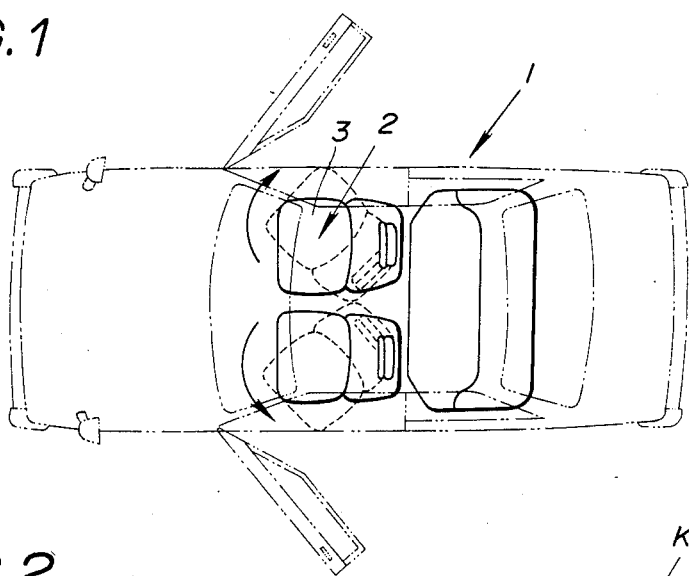
FIG. 1 is a plan view of an automotive vehicle in which the preferred embodiment of a swivel seat is installed.

Referring now to the drawings, particularly to FIG. 1, the preferred embodiment of a swivel seat 2 for a vehicle 1, according to the present invention, is pivotable between a normal position in which the seat faces forward and a pivoted position in which it faces outward. Hereafter, the normal, forward-facing position will be referred to as "normal position" and the outward-facing position will be referred to as "pivoted position". In the pivoted position, the seat cushion 3 of the seat 2 is directed toward the corresponding door opening of the vehicle so that the occupant of the seat can more easily get into or out of the vehicle. A pivot mechanism allowing the seat 2 to pivot between the normal position and the pivoted position is built into the bottom of the seat cushion 3 and pivotally supports the seat cushion 3. In addition, the swivel seat 2 has a lock mechanism for locking the seat in the normal position.

FIGS. 2 to 6 show the pivot mechanism for the preferred embodiment of the swivel seat 2 according to the invention. The pivot mechanism generally comprises a stationary base 20 and a pivotal support 21. The stationary base 20 is secured to the vehicle floor. The pivotal support 21 forms a generally box-shaped seat cushion frame, on which a fabric cushion is mounted to constitute the seat cushion 3. The seat cushion frame, i.e. the pivotal support 21 is connected to a seat back frame (not shown) through a well-known reclining mechanism (not shown) and a seat back bracket 50.

The pivotal support 21 is connected to the stationary base 20 by means of a pivot assembly 22. The pivot assembly 22 comprises a shaft 26 and a bearing 27, as shown in FIG. 3. The shaft 26 rotatably supports the pivotal support 21 at its upper end. A plurality of support roller assemblies 23 are mounted on the upper surface of the stationary base 20. Each of the roller assemblies comprises a roller support bracket 23a and a pair of rollers 23b and 23c rotatably supported by the roller support bracket by means of an axle 23d. The rollers 23b and 23c move in constant contact with the lower surface of a bottom plate 24 of the pivotal support 21 to expedite pivotal movement of the pivotal support with respect to the stationary base 20.

The stationary base 20 is of generally cut-cornered square or rectangular configuration in plan view. Pins 30a and 30b protrude upwards from diagonally opposed corners of the stationary base 20. The pins 30a and 30b have stopper heads 31a and 31b of larger diameter than the pins. Hooking plates 33a and 33b are secured to the bottom plate 24 of the pivotal support 21. Each of the hooking plates 33a and 33b has a vertical section 331 and a horizontal section 332. The vertical section 331 is welded to the vertical side wall of the pivotal suport 21. The horizontal section 332 has a hooking recess 34a or 34b with a flanged edge 32a or 32b. The hooking plates 33a and 33b are installed at positions corresponding to the pins 30a and 30b. The open ends of the hooking recesses 34a and 34b oppose the corresponding pins 30a and 30b. With this arrangement, the pins 30a and 30b engage the corresponding hooking recesses 34a and 34b when the swivel seat 2 is moved to its normal position. On the other hand, during pivotal movement of the pivotal support 21 from the normal position to the pivoted position, the hooking plates 33a and 33b come free of the pins 30a and 30b. When the hooking recesses 34a and 34b of the hooking plate 33a and 33b engage the pins 30a and 30b, the upper faces of the flanged edges 32a and 32b contact the lower surfaces of the stopper heads 31a and 31b of the pins.

Figure 6:
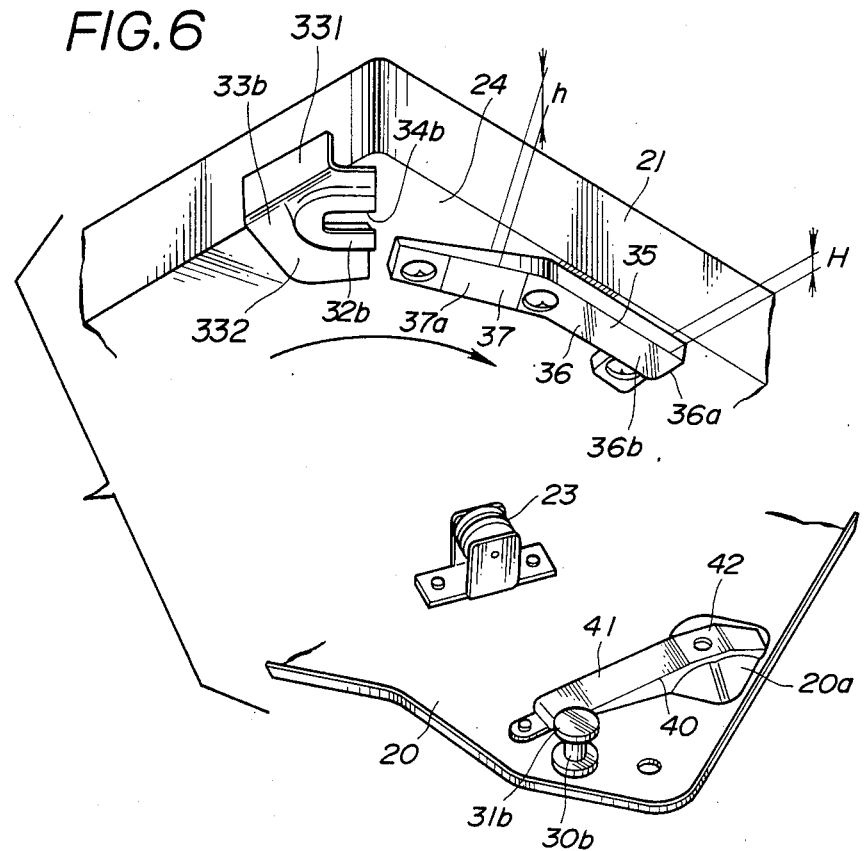
FIG. 6 is a perspective view of the major sections of the swivel seat frame of FIG. 2.

As best shown in FIG. 6, a slider member 35 is secured to the lower surface of the bottom plate 24 of the pivotal support 21 by means of a fastening screws. The slider member 35 is located near the hooking plate 33b opposite the open end of the hooking recess 34b. The slider member 35 may be molded out of synthetic resin. The slider member 35 has a forward section 36 with an essentially vertical end 36a and an essentially horizontal lower contact surface 36b, and a rearward section 37 continuing from the rearward end of the forward section 36 to near the hooking plate 33b and having a tapered lower surface 37a, which tapered surface slants upwards toward the end opposite the hooking plate 33b. A slider member 40 is mounted on the upper surface of the stationary base 20 opposite the slider member 35. The slider member 40 is made of bent metal plate and is secured to the base by means of fastening screws. The slider member 40 is located near the pin 30b and has a tapered section 41 slanting downward towards the end near the pin 30b and a support section 42 resting on a raised boss 20a on the upper surface of the stationary base 20.

The slider members 35 and 40 are so arranged that as the swivel seat 2 pivots, the front end 36a of the slider member 35 comes into contact with the tapered section 41 of the slider member 40 before engagement between the pins 30a and 30b and the hooking plates 33a and 33b, and when the pins 30a and 30b and the hooking plates 33a and 33b engage, the tapered lower surface 37a is in contact with the support section 42.

As is clearly shown in FIG. 6, the height H of the forward section 37 is higher than that (h) of the rearward section 36. The height h is selected so that when the tapered lower surface 37a contacts the upper surface of the support section 42 upon engagement between pins 30a and 30b and the hooking plates 33a and 33b, the pivotal support 21 will be substantially horizontal and parallel to the base 20.

Figure 2:
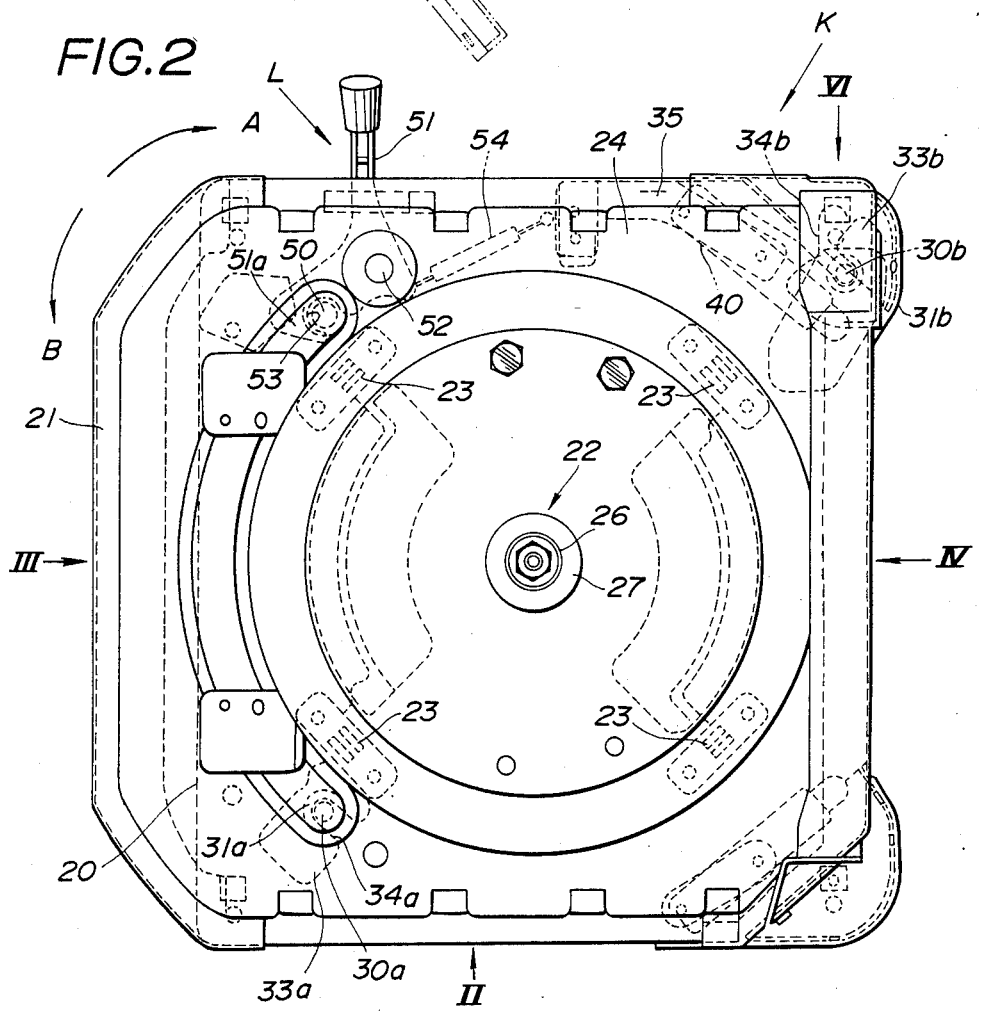
FIG. 2 is a plan view of a major part of the preferred embodiment of the swivel seat according to the invention.

As shown in FIG. 2, the locking mechanism comprises a lock pin 50 projecting upwards from the stationary base 20. The lock pin 50 lies outside the trace of the roller assemblies 23 in the front corner of the side which does not have the pin 30a. A locking lever 51 is pivotable about a pivot shaft extending from the pivotal support 21. The locking lever 51 has a locking head 51a with a locking recess 53 which can engage the lock pin 50. The locking lever 51 is biased toward the locking pin 50 by means of a spring 54. Locking engagement between the locking lever 51 and the lock pin 50 is established when the seat is in its normal position.

Figure 7:
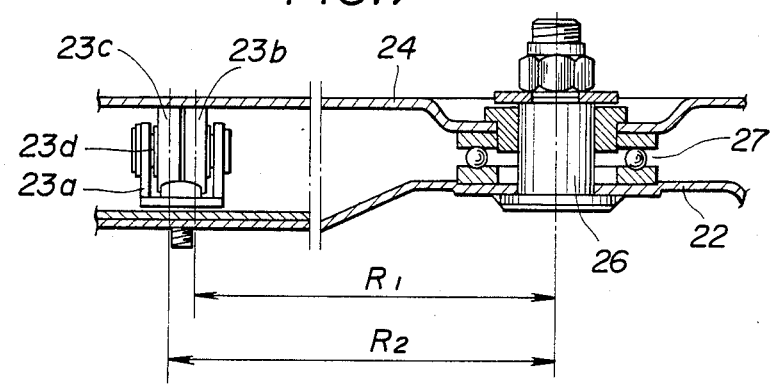
FIG. 7 is a partial section taken along line VII—VII of FIG. 2.

As shown in FIG. 7, the rollers 23b and 23c of the roller assembly 23 are radially aligned at distances $R_1$ and $R_2$ from the central pivot axis 26. The rollers 23b and 23c are rotatable about the axle 23d independently of each other. As a result, difference between the rotation speeds of the rollers 23b and 23c will not affect smooth pivotal movement of the pivotal support 21 relative to the stationary base 20. Furthermore, by separating the roller into two parts, friction between the roller and the lower surface of the bottom plate 24 of the pivotal support 21 can be reduced. This also helps smooth rotation of the pivotal support 21 relative to the stationary base.

To pivot the swivel seat 2 from the normal position toward the pivoted position, the locking lever 51 is manually operated against the spring force of the spring 54 to release the locking engagement between the locking recess 53 and the lock pin 50. The seat 2 is then free to pivot about the pivot assembly in the direction A as indicated in FIG. 2.

An appropriate stopper may be provided to restrict pivotal movement of the pivotal support 21 relative to the stationary base.

In order to return the seat 2 to the normal position, the pivotal support 21 is turned in the direction B as indicated in FIG. 2. A passenger will be sitting in the seat, thus exerting a load downward on the seat frame, and the load at various points of the seat will tend to be uneven. This causes either the front end or the rear end of the pivotal support 21 to tilt downward toward the stationary base 20. This condition has been shown in FIG. 8, in which the front end 36a of the slider member 35 is just in contact with the tapered section 41 of the slider member 40. Again, due to the uneven load distribution, the stopper head 31b of the pin 30b is in contact with the lower surface of the bottom plate 24 of the pivotal support 21.

As the pivotal support 21 turns further relative to the stationary base 20, the front end 36a of the slider member 35 moves upwards along the upper tapered surface of the tapered section 41 of the slider member 40. This raises the pivotal support 21 away from the stationary base. At this time, since the first contact point of the front end 36a of the slider member 35 relative to the tapered upper surface of the tapered section 41 of the slider member 40 is determined by the vertical separation between the pivotal support and the stationary base, the front end 36a remains in continuous contact with the tapered upper surface of the tapered section 41 without causing any noticeable shocks or impact. This smooth transition is facilitated by the roller assemblies 23 which reduce the load on the slider members 35 and 40.

When the front end 36a of the forward section 36 of the slider member 35 reaches the support section 42 of the slider member 40, the vertical distance between the pivotal support 21 and the stationary base 20 reaches its maximum. At this point, the pivotal support 21 clears the stopper head 31a and 31b of the pins 30a and 30b, as shown in FIG. 9. Therefore, the pins 30a and 30b will not interfere with further pivotal movement of the pivotal section 21 relative to the stationary base 20.

As the pivotal support 21 moves to the normal position, the lower contact surface 36b of the section 36 of the slider member 35 passes over the upper surface of the support section 42 and the tapered surface 37a of the section 37 comes into contact with the upper surface of the support section 42 of the slider member 40, as shown in FIG. 10. As set forth previously, near the end of pivotal movement toward the normal position, the pivotal support 21 is held substantially horizontal due to contact between the tapered surface 37a of the rearward section 37 of the slider member 35 and the upper surface of the support section 42 of the slider member 40. This also holds the horizontal sections 33d of the hooking plates 33a and 33b substantially horizontal. This assures smooth engagement between the hooking plates 33a and 33b and the pins 30a and 30b. Therefore, no bending or otherwise distorting forces will be exerted on the pins 30a and 30b or the hooking plates 33a and 33b.

At the end of the pivotal movement of the pivotal support 21 into the normal position, i.e. upon engagement between the pins 30a and 30b and the hooking plates 33a and 33b, the locking lever 51 is pivotally moved to its locking position by the bias spring 54. As a result, the swivel seat 2 is locked at its normal position.

During normal use, uneven load distribution across the seat generates forces which would cause pitching about a transverse, horizontal axis. For example, when the occupant applies a heavier load on the front edge of the seat, the rear part of the seat tends to raise. However, since the hooking plate 33b and pin 30b engage with the flange 32 in firm contact with the lower surface of the stopper head 31b, upward lift of the rear part of the seat is successfully prevented. Furthermore, since the heavier load exerted on the front portion of the seat is received by the roller assemblies 23 near the front edge, the pivotal support 21 can be held substantially horizontal. Similarly, when the relatively heavy load is exerted on the rear part of the seat, the front part of the pivotal support 21 is held level by the engagement between the pin 30a and the hooking plate 33a. In this case, the heavier load applied to the rear part of the seat is received by the roller assemblies 23 located near the rear edge and by the slider members 35 and 40.

What is claimed is:

1. A swivel seat comprising:
   a stationary component secured to a floor;
   a pivotal component supporting a seat cushion for rotation therewith and pivotably supported directly above said stationary component, said pivotal component being pivotable between a first normal position and second pivoted position displaced by a predetermined angle from said first position;

latching means for restricting movement of said pivotal component away from said stationary component at said first normal position of said pivotal component, said latching means including a first member secured to said stationary component, and a second member secured to said pivotal component and engageable to said first member at least at said first normal position; and a third member secured to said stationary component and having a first surface and a fourth member secured to said pivotal component and having a second surface, said first surface coming into contact with said second surface so that said third and fourth members restrict downward displacement of said pivotal component toward said stationary component, due to a load on said pivotal component, said third and fourth members cooperating with each other to raise said pivotal component to a predetermined highest position and cooperating with said latching means to restrict deformation of said pivotal component so as to maintain said pivotal component substantially in parallel to said stationary component at least at said first normal position.

2. The swivel seat as set forth in claim 1, which further comprises locking means for locking said pivotal component so as to prevent the latter from pivoting, said locking means being active at least at said first position of said pivotal component.

3. The swivel seat as set forth in claim 1, which further comprises at least one roller assembly disposed between said pivotal component and said stationary component for smooth pivotal movement of said pivotal component.

4. The swivel seat as set forth in claim 3, wherein said second member is secured to at least one of the front and rear edges of said pivotal component so as to restrict upward displacment of the corresponding at least one of front and rear edges of said pivotal component.

5. The swivel seat as set forth in claim 3, wherein said roller assembly comprises an inner roller and an outer roller independently rotatably mounted on a common axle.

6. The swivel seat as set forth in claim 1, wherein said third and fourth members restrict downward displacement of said pivotal component toward said stationary component, due to a load on said pivotal component, at least at said first position of said pivotal component.

7. A swivel seat comprising:

a stationary component secured to a floor;

a pivotal component supporting a seat cushion for rotation therewith and pivotably supported directly above said stationary component, said pivotal component being pivotable between a first normal position and a second pivotal position displaced by a predetermined angle from said first position;

means for restricting movement of said pivotal component away from said stationary component at said first normal position of said pivotal component and for restricting deformation of said pivotal component so as to maintain said pivotal component substantially in parallel to said stationary component;

said means including a first member secured to said stationary component and a second member secured to said pivotal component, said first member being engageable to said second member when said pivotal component is in said first position and restrict upward movement of said pivotal component when engaged;

said means further including a third member secured to said stationary component and having a first surface and a fourth member secured to said pivotal component and having a second surface, said first surface coming into contact with said second surface to maintain said pivotal component in a predetermined relationship with said stationary component, at least at said first position of said pivotal component;

said third and fourth members restricting downward displacement of said pivotal component toward said stationary component, due to a load on said pivotal component, at least at said first position of said pivotal component;

said third member comprising a first section having a level surface with an active edge and a second section having a sloped surface decreasing in height toward an end remote from said first section, and said fourth member comprising a third section having a level surface with an active edge and a fourth section having a sloped surface decreasing in vertical dimension toward an end remote from said third section, and said third and fourth members cooperating in such a manner that during pivotal movement of said pivotal component from said second position to said first position, said active edge of said first section comes into contact with said sloped surface of said fourth section;

then said active edge of said first section moves toward said level surface of said third section along said sloped surface of said fourth section so as to raise said pivotal component to a predetermined highest position;

said level surface of said first section then comes into contact with and crosses said level surface of said third section; and said sloped surface of said second section finally comes into contact with a junction between said third section and said fourth section and then crosses said sloped surface of said fourth section, whereby said pivotal component is lowered to a predetermined vertical position relative to said stationary component at said first position of said pivotal component.

* * * * *